(12) United States Patent
Watts (10) Patent No.: US 9,442,835 B1
(45) Date of Patent: Sep. 13, 2016

(54) DYNAMIC MEMORY ALLOCATION USING SUBALLOCATION OF CELL BLOCKS

(71) Applicant: CA, Inc., Islandia, NY (US)

(72) Inventor: Keith Watts, York, ME (US)

(73) Assignee: CA, Inc., Islandia, NY (US)

( * ) Notice: Subject to any disclaimer, the term of this patent is extended or adjusted under 35 U.S.C. 154(b) by 204 days.

(21) Appl. No.: 14/193,885

(22) Filed: Feb. 28, 2014

(51) Int. Cl.
*G06F 12/02* (2006.01)
*G06F 12/06* (2006.01)

(52) U.S. Cl.
CPC ......... *G06F 12/023* (2013.01); *G06F 12/0669* (2013.01)

(58) Field of Classification Search
CPC .................................................... G06F 12/023
See application file for complete search history.

(56) References Cited

U.S. PATENT DOCUMENTS

| 2008/0209154 A1* | 8/2008 | Schneider | G06F 12/023 711/170 |
| 2008/0222380 A1* | 9/2008 | Sze | G06F 12/023 711/170 |
| 2014/0115424 A1* | 4/2014 | Yoo | G06F 12/00 714/763 |

* cited by examiner

*Primary Examiner* — Daniel Tsui
(74) *Attorney, Agent, or Firm* — Coats & Bennett, P.L.L.C.

(57) ABSTRACT

A computer-implemented method is disclosed in which a memory suballocation application obtains, from an underlying memory allocation system (UMAS), allocation of a plurality of cell blocks. Each cell block includes a plurality of equally-sized cells and a bitmap indicating which of its cells are available. A request is received from a requesting application for dynamic allocation of a given amount of memory. If the given amount of memory exceeds a maximum cell size, memory allocation is initiated via the UMAS for the given amount of memory without using the cell blocks. If the given amount of memory does not exceed the maximum cell size, a desired cell size is determined. If a bitmap of one of the cell blocks indicates that a cell having the desired cell size is available, the memory suballocation application is used to dynamically allocate a cell having the desired cell size to the requesting application.

20 Claims, 7 Drawing Sheets

DYNAMIC MEMORY ALLOCATION USING SUBALLOCATION OF CELL BLOCKS

TECHNICAL FIELD

The present disclosure relates to memory allocation, and more particularly relates to dynamic memory allocation using a plurality of cell blocks that each include a plurality of equally-sized cells.

BACKGROUND

In computer programming, static variables (e.g., global variables) have a lifetime that extends to the life of a program. However, when the program stops executing, these variables are deallocated. Similarly, automatic variables (e.g., local variables) have a lifetime that extends to the duration of the function in which they are executed, but once that function completes execution then they are deallocated, and therefore they do not survive multiple function calls. Moreover, the size of static and automatic variables must be known when a program is compiled.

To facilitate variables whose size is unknown until runtime, and/or to facilitate variables whose life extends outside of the execution of a program or function, dynamic memory allocation is used to create dynamic variables. In the prior art, dynamic allocation has used a "heap" portion of system memory. Use of the heap has involved a complex system of pointers which requires a significant amount of computing resources to process. For example, in the C programming language "malloc" is a commonly used dynamic memory allocation tool. When invoked, malloc looks for free space in the heap, and once free space is found it reserves that free space and returns a pointer to the reserved portion of the heap. The process of looking for free space in the heap (and correspondingly freeing up used space in the heap through deallocation when it is no longer needed) has required a considerable amount of computing resources. An alternate dynamic memory allocation scheme known as the "buddy system" provides some improvements, but is still relatively inefficient.

SUMMARY

According to one aspect of the present disclosure, a computer-implemented method is disclosed which obtains, from an underlying memory allocation system, an allocation of a plurality of cell blocks to a memory suballocation application. Each of the cell blocks includes a plurality of equally-sized cells and also includes a bitmap indicating which of its plurality of cells are available. A request for dynamic allocation of a given amount of memory is received from a requesting application. A determination is made of whether the given amount of memory exceeds a maximum cell size. If the given amount of memory exceeds the maximum cell size, a memory allocation is initiated via the underlying memory allocation system for the given amount of memory that does not use any of the plurality of cell blocks. If the given amount of memory does not exceed the maximum cell size, a desired cell size is determined by: interpreting the given amount of memory as a desired cell size if the given amount of memory is a valid cell size; or rounding the given amount of memory up to a nearest valid cell size to determine the desired cell size if the given amount of memory is not a valid cell size. If a bitmap of one of the plurality of cell blocks indicates that a cell having the desired cell size is available, then the cell having the desired cell size is dynamically allocated to the requesting application, via the memory suballocation application. The bitmap of the cell block to which the cell belongs is updated to indicate that the cell is no longer available.

According to another aspect of present disclosure, a computing device is disclosed which includes a memory circuit and a controller. The controller is configured to obtain, from an underlying memory allocation system, an allocation of a plurality of cell blocks to a memory suballocation application. Each of the cell blocks includes a plurality of equally-sized cells and also includes a bitmap indicating which of its plurality of cells are available. The controller is further configured to receive, from a requesting application, a request for dynamic allocation of a given amount of memory, and determine if the given amount of memory exceeds a maximum cell size. The controller is further configured to, if the given amount of memory exceeds the maximum cell size, initiate a memory allocation via the underlying memory allocation system for the given amount of memory that does not use any of the plurality of cell blocks. The controller is further configured to, if the given amount of memory does not exceed the maximum cell size, determine a desired cell size by interpreting the given amount of memory as a desired cell size if the given amount of memory is a valid cell size, or rounding the given amount of memory up to a nearest valid cell size to determine the desired cell size if the given amount of memory is not a valid cell size. The controller is further configured to, if a bitmap of one of the plurality of cell blocks indicates that a cell having the desired cell size is available, dynamically allocate, via the memory suballocation application, the cell having the desired cell size to the requesting application; and update the bitmap of the cell block to which the cell belongs to indicate that the cell is no longer available.

According to another aspect of the present disclosure, a computer program product is disclosed which includes a computer readable storage medium having computer readable program code embodied therewith. The computer readable program code includes computer readable program code configured to obtain, from an underlying memory allocation system, an allocation of a plurality of cell blocks to a memory suballocation application, wherein each of the cell blocks includes a plurality of equally-sized cells and also includes a bitmap that indicates which of its plurality of cells are available. The computer readable program code also includes computer readable program code configured to receive, from a requesting application, a request for dynamic allocation of a given amount of memory, and computer readable program code configured to determine if the given amount of memory exceeds a maximum cell size. The computer readable program code also includes computer readable program code configured to initiate a memory allocation via the underlying memory allocation system for the given amount of memory that does not use any of the plurality of cell blocks if the given amount of memory exceeds the maximum cell size. The computer readable program code also includes computer readable program code configured to, if the given amount of memory does not exceed the maximum cell size determine a desired cell size by: interpreting the given amount of memory as a desired cell size if the given amount of memory is a valid cell size; or rounding the given amount of memory up to a nearest valid cell size to determine the desired cell size if the given amount of memory is not a valid cell size. The computer readable program code also includes computer readable program code configured to, if a bitmap of one of the plurality of cell blocks indicates that a cell which has the desired cell size is available: dynamically allocate, via the memory suballocation application, the cell which has the desired cell size to the requesting application; and update the bitmap of the cell block to which the cell belongs to indicate that the cell is no longer available.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure describes a method, apparatus, and computer program product for memory allocation. The techniques described utilize cell blocks which include a plurality of equally-sized cells, and those cell blocks are suballocated based on dynamic memory allocation requests (e.g., instead of using the heap). By using cell blocks, and optionally also using a specific cell block addressing scheme, significant performance gains can be achieved. In one specific embodiment each cell block has a size of 64 kilobytes (KB), and a number of cell blocks are allocated, each with cell having equally-sized cells of a size that is a power of 2 (e.g., 16 bytes, 32 bytes, 64 bytes, 128 bytes, 256 bytes, etc.).

Figure 1:
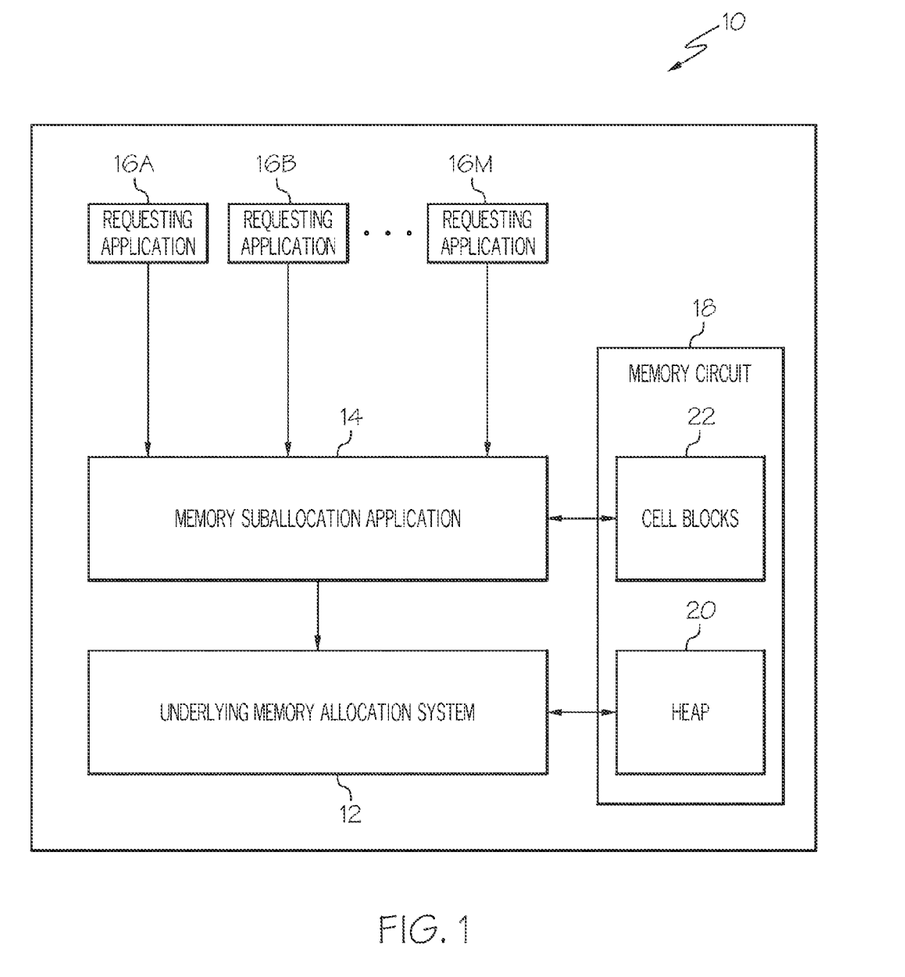
FIG. 1 illustrates a number of functional elements of an example computing device operative to perform memory allocation.

Referring now to FIG. 1, a number of functional elements of an example computing device 10 operative to perform memory allocation are shown. The elements include an underlying memory allocation system 12, a memory suballocation application 14, a number of requesting applications 16, and a computer readable storage medium (shown as memory circuit 18). The memory circuit includes a heap 20 and a plurality of cell blocks 22. The underlying memory allocation system 12 is operative to dynamically allocate memory from the heap 20. In one example, the underlying memory allocation system 12 is an operating system (e.g., WINDOWS or LINUX) or a C or C++ runtime library. The memory suballocation application 14 is operative to perform dynamic memory allocation to suballocate cell blocks from the plurality of cell blocks 22 to the plurality of requesting application 16A-16M.

Figure 1A:
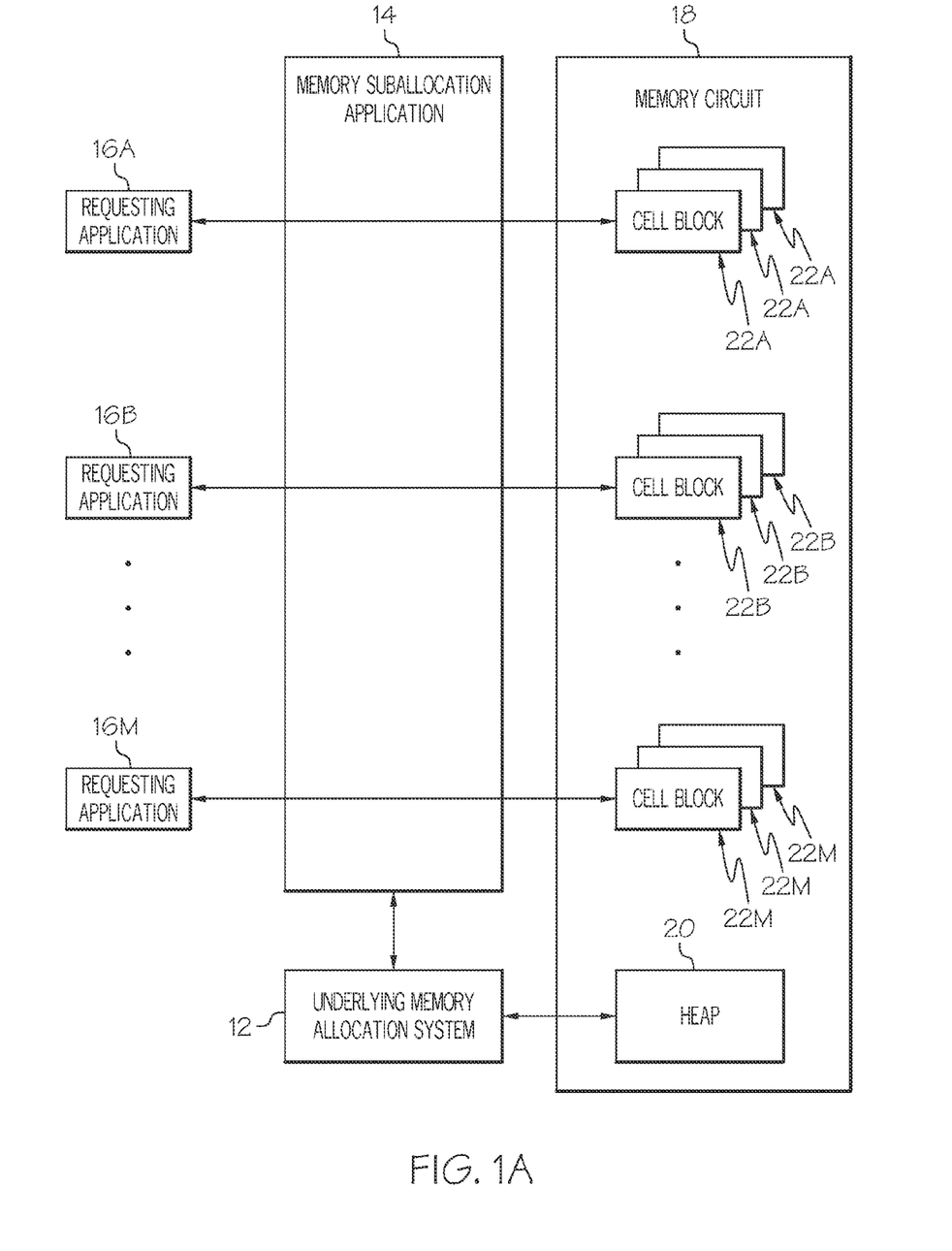
FIG. 1A illustrates aspects of FIG. 1 in greater detail according to an example embodiment.

FIG. 1A illustrates aspects of FIG. 1 in greater detail according to an example embodiment, in which each requesting application has its own group of cell blocks 22, and in which cell blocks are not shared between requesting applications. For example, in FIG. 1A requesting application 16A has been suballocated a plurality of cell blocks 22A, requesting application 16B has been suballocated a plurality of cell blocks 22B, and requesting application 16M has been suballocated a plurality of cell blocks 22M. The requesting applications do not share their cell blocks between each other. Thus, requesting application 16A cannot obtain a dynamic memory allocation from cell blocks 22B or 22M, but can obtain a dynamic memory allocation from one of the cell blocks 22A. The heap 20, meanwhile, can be shared by the plurality of requesting applications at the same time.

Figure 2:
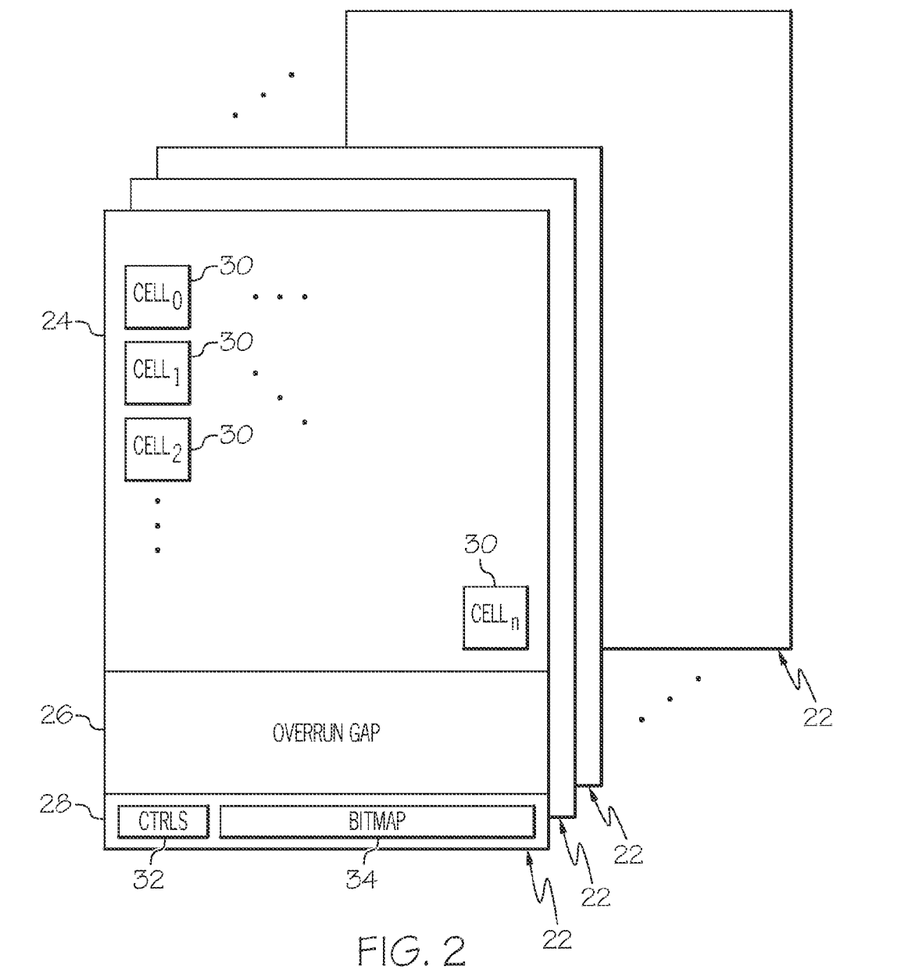
FIG. 2 illustrates a plurality of example cell blocks.

Each cell block include a plurality of equally-sized cells and also includes a bitmap indicating which of its plurality of cells are available. FIG. 2 illustrates an example collection of cell blocks 22, which each include a cell section 24, an overrun gap 26, and a control and bitmap section 28. The cell section 24 includes a plurality of equally-sized cells 30 (shown as $CELL_0$-$CELL_n$). The overrun gap 26 acts as buffer between sections 24 and 28, as a preventative step to prevent a memory overrun from overwriting section 28. Section 28 includes a controls section 32 which indicates the size of the plurality of equally-sized cells 30 in its corresponding cell block 22, and also includes a bitmap 34 which indicates which of the plurality of cells 30 are available. Thus, in some embodiments within a given cell block 22, the plurality of equally-sized cells 30 are located in a beginning portion of the cell block (section 24), the bitmap 34 of the cell block 22 is located in a later portion of the cell block (section 28) having a higher memory address than the beginning portion, and the overrun gap 26 separates the beginning portion of the cell block 22 and the later portion of the cell block 22.

Figure 3:
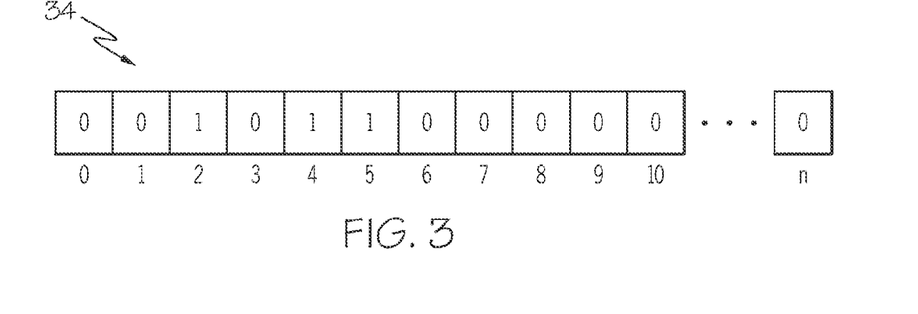
FIG. 3 illustrates an example bitmap for a cell block.

FIG. 3 shows an example bitmap 34, in which each bit corresponds to one of the cells 30 of a given cell block. In one example a "0" indicates that a corresponding cell is not available, and a "1" indicates that a corresponding cell is available. Of course, this is only an example, and it is understood that the opposite arrangement could be used (e.g., where a "0" indicates availability and a "1" indicates unavailability).

In one example each cell size is a power of two (e.g., 16, 32, 64, 128, 256, etc.). In the same or another example, each cell block has a size of 64 kilobytes (KB), section 24 has 60 KB, section 26 is 3 KB, and section 28 is 1 KB. In such a configuration, approximately 8,000 cells could be tracked with a single bitmap 34 (one per bit for approximately 1 KB).

Figure 4:
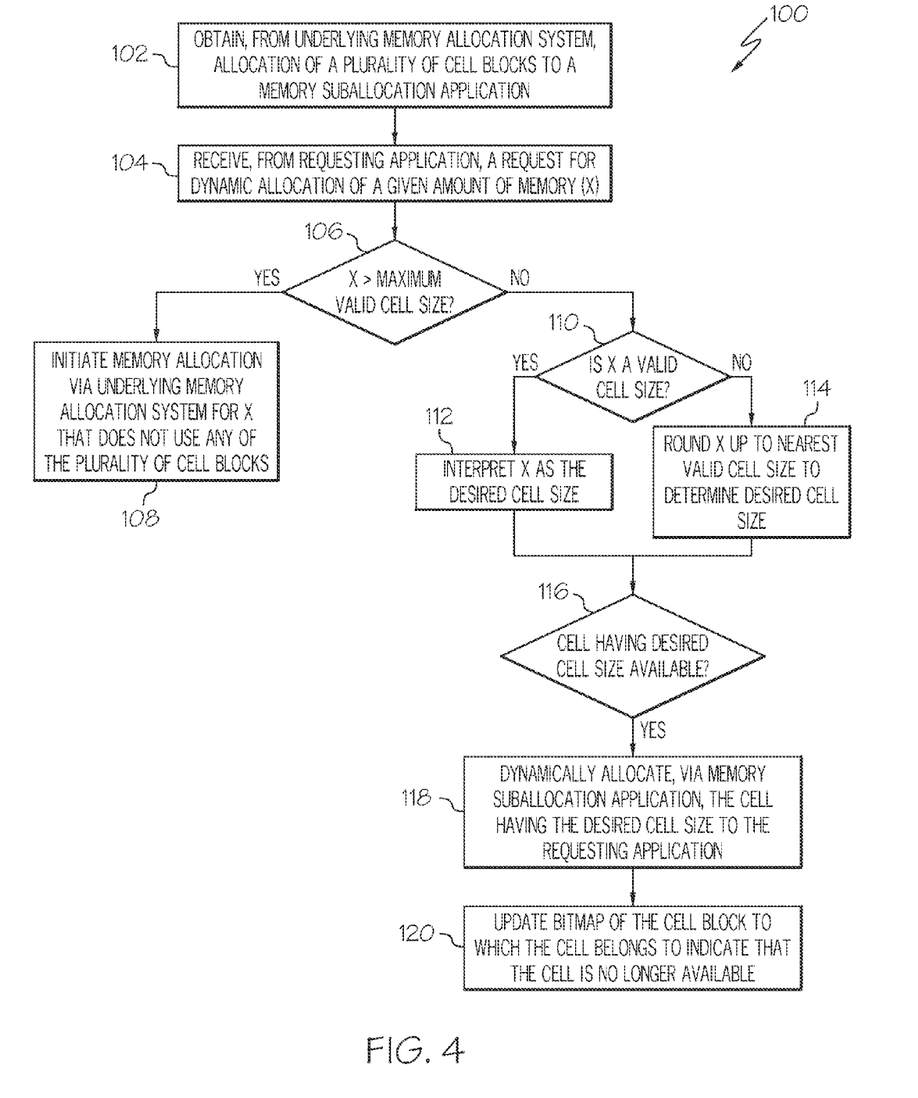
FIG. 4 illustrates an example memory allocation method.

FIG. 4 illustrates an example memory allocation method 100. According to the method, a plurality of cell blocks 22 are allocated to memory suballocation application 14 (step 102). The allocation of step 102 is performed by underlying memory allocation system 12 such that the memory suballocation application 14 obtains the allocation of the plurality of cell blocks 22. As discussed above, each of the cell blocks 22 includes a plurality of equally-sized cells 30 and also includes a bitmap 34 that indicates which of its plurality of cells 30 are available (see FIGS. 2-3). In this regard, "equally-sized cells" means that within a given cell block 22, each cell 30 has the same size, but does not require all cell blocks 22 to use cells of the same size. Thus, for example, one cell block may contain equally-sized cells that are 16 bytes, and another cell block may contain equally-sized cells that are 32 bytes, etc.

For the discussion below, assume that in block 102 the following four cell blocks are allocated: $Cell_0$ (16 byte cells), $Cell_1$ (32 byte cells), $Cell_2$ (64 byte cells), and $Cell_3$ (128 byte cells). Also assume that 128 bytes is a maximum cell size.

A request is received from a requesting application 16 for a dynamic allocation of a given amount of memory (step 104). A determination is made if the given amount of memory exceeds a maximum cell size (step 106). If the given amount of memory exceeds the maximum cell size (e.g., if a 150 byte allocation is requested in block 104, which exceeds the 128 byte maximum), a memory allocation is initiated via the underlying memory allocation system 12 for the given amount of memory that does not use any of the plurality of cell blocks (step 108).

However, if the given amount of memory does not exceed the maximum cell size (a "no" to 106), a desired cell size is determined (steps 112, 114). If the given amount of memory is a valid cell size (e.g., if 16 bytes are requested), the given amount of memory is interpreted as a desired cell size (step 112). Otherwise, if the given amount of memory is not a valid cell size (e.g., 14 bytes, which is not a power of 2), then the given amount of memory is rounded up to a nearest valid cell size (e.g., 16 bytes) to determine the desired cell size (step 114). A valid cell size is a cell size used by equally-sized cells in one of the plurality of cell blocks. Thus, if no cell block uses 16 byte cells, then 16 bytes would not be considered a valid cell size. However, if an allocated cell block uses equally-sized cell of 16 bytes (which is the case in this example), then 16 bytes is a valid cell size.

A determination is made of whether a cell having the desired cell size is available (e.g., are any 16 byte cells available) (step 116). This may involve, for example, parsing the bitmaps of one or more cell blocks 22 whose cells are of the desired cell size (e.g., the bitmaps of multiple cell blocks 22 which all have 16 byte cells) to determine if any cells in the one or more cell blocks are available.

If a bitmap of one of the plurality of cell blocks indicates that a cell having the desired cell size is available (a "yes" to 116), then the memory suballocation application 14 is used to dynamically allocate the cell which has the desired cell size to the requesting application 16 (step 118), and the bitmap of the cell block 22 to which the cell belongs is updated to indicate that the cell is no longer available (step 120).

Figure 4A:
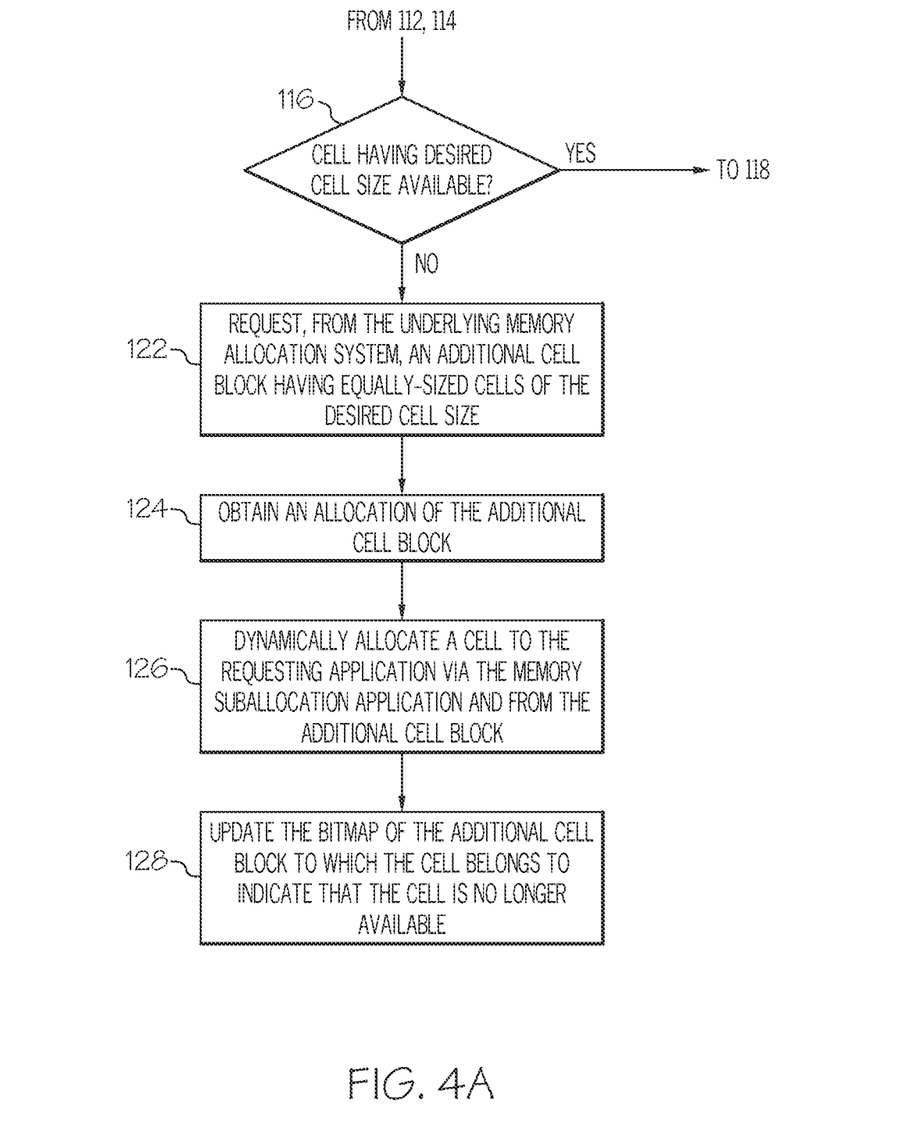
FIG. 4A illustrates a particular embodiment of the method of FIG. 1

FIG. 4A illustrates a particular embodiment of the method of FIG. 1. A determination is made of whether a cell having the desired cell size is available (step 118), and if a cell having the desired cell size is not available (e.g., if all cells are full in cell blocks having 16 byte cells), then the memory suballocation application 14 requests an additional cell block having equally-sized cells of the desired cell size (e.g., 16 bytes) from the underlying memory allocation system 12 (step 122).

An allocation of the requested additional cell block is obtained from the underlying memory allocation system 12 (step 124). The memory suballocation application 14 dynamically allocates a cell to the requesting application 16 via from the additional cell block (step 126). The memory suballocation application 14 updates the bitmap of the additional cell block to which the additional cell belongs to indicate that the cell is no longer available (step 128) (e.g., by changing a "1" in the bitmap to a "0"). In one or more embodiments (e.g., as described in connection with FIG. 1A above), once the additional cell block has been allocated to a given requesting application (step 124), that cell block cannot be suballocated to a different requesting application, and can only be suballocated to the single, given requesting application.

Figure 5:
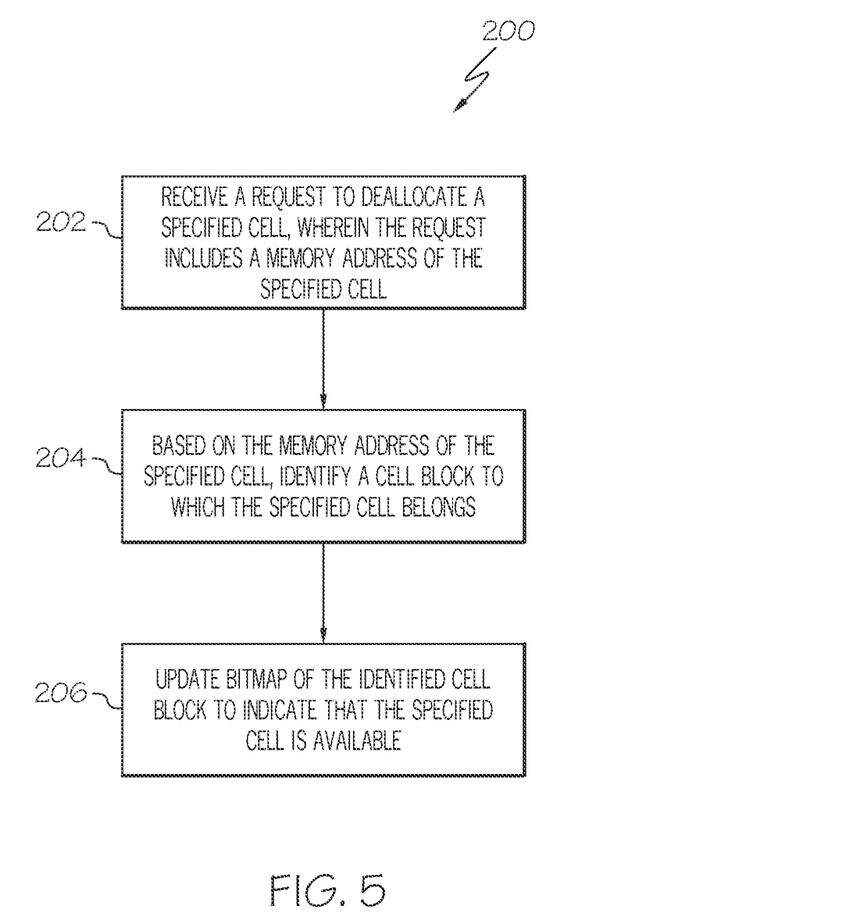
FIG. 5 illustrates an example memory deallocation method.

FIG. 5 illustrates an example memory deallocation method 200, which deallocates a cell of a memory block for the purposes of the memory suballocation application 14. Only the suballocation of the cell block is deallocated though (i.e., the cell block to which the cell belongs remains allocated to the memory suballocation application 14). In one example the allocated cell blocks are not deallocated back to the underlying memory allocation system 12 until the memory suballocation application is terminated.

A request is received to deallocate a specified cell, wherein the request includes a memory address of the specified cell (step 202). Based on the memory address of the specified cell, a cell block is identified to which the specified cell belongs (step 204). The bitmap of the identified cell block is updated to indicate that the specified cell is available (step 206) (e.g., by changing a "0" in the bitmap to a "1").

In one embodiment of the method 200, each cell block has a size of 64 KB, the four least significant hexadecimal digits of each memory block base address is 0000, and identifying a cell block to which the specified cell belongs (step 204) comprises performing an "AND" operation between the memory address of the specified cell and the hexadecimal value FFFF0000 to determine a base address of the identified cell block. In this embodiment, each memory block has a hexadecimal address format of xxxx0000 (where "xxxx" indicates a four digit "nibble"). Thus, if an address of a cell was 87019301, and an AND operation was performed between this value and FFFF0000, then the result would be 87010000, meaning that 87010000 was a base address of the cell block to which the cell 87019301 belonged.

To explain the example above in greater detail, the hexadecimal value FFFF is 1111 1111 1111 1111 in binary, which causes the four most significant hexadecimal digits of the address to remain the same (i.e. 8701 remains 8701 after the AND operation). Meanwhile, the four least significant hexadecimal digits of 0000 (which is 0000 0000 0000 0000 in binary) will render the four least significant hexadecimal digits of the address to be zero (thus 9301 becomes 0000). This addressing scheme and address lookup method provides a quick and efficient way of finding a cell block using minimal computational resources.

In one or more embodiments, the allocation, via the underlying memory allocation system 12, of the plurality of cell blocks 22 to the memory suballocation application 14 is preceded by a memory request. In one example, that memory request specifies that the memory address of each cell block 22 allocated must be aligned on a 64 KB boundary, such that the four least significant hexadecimal digits of each cell block address are 0000. An example hexadecimal memory address that is aligned on a 64 KB boundary is 12340000. This could facilitate the cell block address identification method discussed above.

Figure 6:
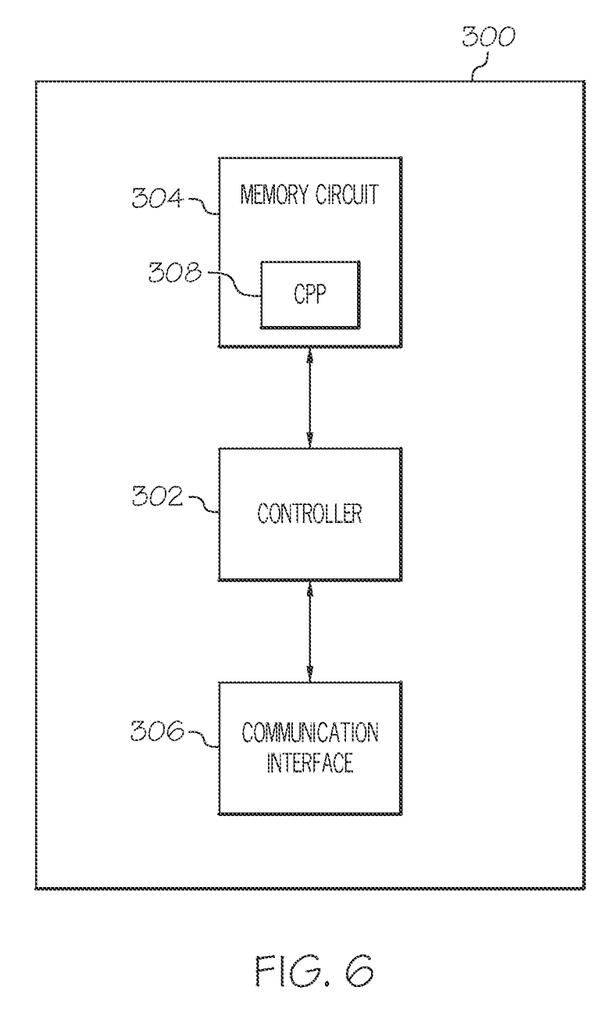
FIG. 6 schematically an example computing device operative to perform the memory allocation method of FIG. 4.

FIG. 6 schematically an example computing device 300 operative to perform the memory allocation method 100 of FIG. 4 (and that may be used as the computing device 10 of FIG. 1). The computing device 300 includes one or more processing circuits (shown as controller 302), a computer readable storage medium (shown as memory circuit 304), and a communication interface 306. The memory circuit 304 may be used as the memory circuit 18 of FIG. 1, for example.

The controller 302 is operative to support an underlying memory allocation system 12, a memory suballocation application 14, and a requesting application 16 (see FIG. 1). The controller 302 is configured to obtain, from the underlying memory allocation system 12, an allocation of a plurality of cell blocks 22 to the memory suballocation application 14, wherein each of the cell blocks 22 includes a plurality of equally-sized cells and also includes a bitmap that indicates which of its plurality of cells are available.

Although these are only non-limiting example values, assume again that the following four cell blocks are allocated: $Cell_0$ (16 byte cells), $Cell_1$ (32 byte cells), $Cell_2$ (64 byte cells), and $Cell_3$ (128 byte cells). Also assume that 128 bytes is a maximum cell size.

The controller 302 receives, from a requesting application 16, a request for dynamic allocation of a given amount of memory, and determines if the given amount of memory exceeds a maximum cell size. If the given amount of memory exceeds the maximum cell size (e.g., if a 150 byte allocation is requested, which exceeds the 128 byte maximum), the controller 302 initiates a memory allocation via the underlying memory allocation system 12 for the given amount of memory that does not use any of the plurality of cell blocks (e.g., using heap 20). If the given amount of memory does not exceed the maximum cell size, the controller 302 determines a desired cell size. If the given amount of memory is a valid cell size (e.g., if 16 bytes are requested), the controller 302 interprets the given amount of memory as a desired cell size. Otherwise, if the given amount of memory is not a valid cell size (e.g., 14 bytes), the controller 302 rounds the given amount of memory up to a nearest valid cell size (e.g., 16 bytes) to determine the desired cell size. If a bitmap of one of the plurality of cell blocks indicates that a cell which has the desired cell size is available, then the controller 302 dynamically allocates, via the memory suballocation application 14, the cell which has the desired cell size to the requesting application 16, and updates the bitmap of the cell block 22 to which the cell belongs to indicate that the cell is no longer available.

In one or more embodiments, the memory circuit 304 includes a computer program product 308 that comprises computer readable program code stored on a computer readable storage medium (e.g., memory circuit 304) that configures the computing device 300 to implement one or more of the techniques described above (e.g., method 100).

In one example the underlying memory allocation system 12 is an operating system (e.g., WINDOWS, LINUX, or ZOS). In one example, the underlying memory allocation system 12 is a C or C++ runtime library which implements a memory allocation function such as "malloc" in C or "new" in C++. In one example the memory suballocation application 14 is a program that operates on top of the operating system to perform memory allocation, such as the "AION Business Rules Expert" product from CA TECHNOLOGIES, which at times performs a considerable amount of memory allocation when analyzing high volumes of business rules. In one example the memory suballocation application 14 is part of an operating system (e.g., acts as an operating system component to perform memory allocation as complete or partial alternative to native memory allocation). Thus, although the word "application" is used in the phrase "memory suballocation application," it is understood that the memory suballocation application 14 is not limited to being what is commonly thought of as a user application that executes on top of the operating system. Rather, as discussed above, the memory suballocation program could be a runtime library and/or an operating system component, for example.

Although some specific examples have been discussed above, it is understood that these are only non-limiting examples, and that other examples could be used. For example, although 128 bytes was discussed as an example maximum cell size, in one or more embodiments the maximum cell size is greater (e.g., 2048 bytes). Also, 64 KB is only an example, not a required, cell block size. For example, similar capabilities could be established for other powers of 2, such as 32 KB, 128 KB, 256 KB, etc. As described above, it can be beneficial for the base address of each cell block to be similarly aligned by the underlying memory allocation system 12, and for the base addresses to be determinable via a corresponding AND operation value. For example, for 32 KB cell blocks a hexadecimal value of FFFF8000 could be used in the AND operation to determine a base address of a cell block (instead of using an FFFF0000 as in the 64 KB cell blocks described above).

Moreover, cell blocks could be internally arranged differently than shown in FIG. 2. For example, the cells may not be located at the beginning of the cell block, but could instead be located at the end of the cell block. Also, the overrun gap could be omitted. Although, the bitmap for a given cell block could be located outside of the cell in one example.

The techniques discussed above could be useful for applications that endure a lot of overhead as a consequence of memory allocation and deallocation. Also, they could be beneficial for consumers encountering CPU saturation challenges, as the techniques discussed above can offer a dramatic reduction in CPU usage performing memory allocation and deallocation more quickly than prior art techniques.

The techniques discussed above could be used to improve the GETMAIN, FREEMAIN, or STORAGE memory allocation function for IBM mainframe assembler programs. The techniques discussed above could also be used to improve IBM Language Environment calls on a mainframe, such as those involving COBOL or PL1 programs. The techniques discussed above could also be used to improve "malloc" calls in C programs and/or "free" calls in C++ programs (e.g., by having "malloc" or "free" use available cells in cell blocks before performing heap allocations).

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   obtaining, by a memory suballocation application from an underlying memory allocation system, an allocation of a plurality of cell blocks from a heap portion of memory, wherein each of the cell blocks includes a plurality of equally-sized cells and a bitmap that indicates which of its plurality of cells are available, and wherein the plurality of cell blocks allocated to the memory suballocation application are managed by the memory suballocation application, and
   the heap portion of memory is managed by the underlying memory allocation system;
   receiving, from a requesting application, a request for dynamic allocation of a given amount of memory;
   determining if the given amount of memory exceeds a maximum cell size of the cells in a plurality of cell blocks allocated to the memory suballocation application;
   if the given amount of memory exceeds the maximum cell size, initiating a memory allocation via the underlying memory allocation system from the heap portion of memory for the given amount of memory that does not use any of the plurality of cell blocks; and
   if the given amount of memory does not exceed the maximum cell size:
      determining a desired cell size by:
         interpreting the given amount of memory as a desired cell size if the given amount of memory is a valid cell size; or
         rounding the given amount of memory up to a nearest valid cell size to determine the desired cell size if the given amount of memory is not a valid cell size; and
      if a bitmap of one of the plurality of cell blocks indicates that a cell which has the desired cell size is available:
         dynamically allocating, via the memory suballocation application, the cell which has the desired cell size to the requesting application; and
         updating, by the memory suballocation application, the bitmap of the cell block to which the cell belongs to indicate that the cell is no longer available; and
      if the desired cell size does not exceed the maximum cell size and no cell of the desired cell size is available, obtaining, from the underlying memory allocation system, an additional cell block from the heap having equally-sized cells of the desired cell size for allocation to the requesting application.

2. The computer-implemented method of claim 1, wherein if the desired cell size does not exceed the maximum cell size and no cell of the desired cell size is available, the method further comprises:
   receiving the allocation of the additional cell block from the underlying memory allocation system;
   dynamically allocating, via the memory suballocation application and from the additional cell block, a cell to the requesting application; and
   updating the bitmap of the additional cell block to which the cell belongs to indicate that the cell is no longer available.

3. The computer-implemented method of claim 1, further comprising:
   determining if a cell having the desired cell size is available by parsing the bitmaps of one or more cell blocks whose cells are of the desired cell size to determine if any cells in the one or more cell blocks are available.

4. The computer-implemented method of claim 1, further comprising:
   receiving a request to deallocate a specified cell, wherein the request includes a memory address of the specified cell;
   based on the memory address of the specified cell, identifying a cell block to which the specified cell belongs; and
   updating the bitmap of the identified cell block to indicate that the specified cell is available.

5. The computer-implemented method of claim 4:
   wherein each cell block has a size of 64 kilobytes;
   wherein the four least significant hexadecimal digits of each memory block base address is 0000; and
   wherein identifying a cell block to which the specified cell belongs comprises performing an AND operation between the memory address of the specified cell and the hexadecimal value FFFF0000 to determine a base address of the identified cell block.

6. The computer-implemented method of claim 1, wherein each valid cell size is a power of two.

7. The computer-implemented method of claim 1, wherein within a given cell block:
   the plurality of equally-sized cells are located in a beginning portion of the cell block;
   the bitmap of the cell block is located in a later portion of the cell block having a higher memory address than the beginning portion; and
   an overrun gap separates the beginning portion of the cell block and the later portion of the cell block.

8. A computing device comprising:
   a memory circuit; and
   a processing circuit configured to:
      obtain, by a memory suballocation application from an underlying memory allocation system, an allocation of a plurality of cell blocks from a heap portion of memory, wherein each of the cell blocks includes a plurality of equally-sized cells and a bitmap that indicates which of its plurality of cells are available, and wherein the plurality of cell blocks allocated to the memory suballocation application are managed by the memory suballocation application, and the heap portion of memory is managed by the underlying memory allocation system;
      receive, from a requesting application, a request for dynamic allocation of a given amount of memory;
      determine if the given amount of memory exceeds a maximum cell size of the cells in a plurality of cell blocks allocated to the memory suballocation application;
      if the given amount of memory exceeds the maximum cell size, initiate a memory allocation via the underlying memory allocation system from the heap portion of memory for the given amount of memory that does not use any of the plurality of cell blocks; and
      if the given amount of memory does not exceed the maximum cell size:
         determine a desired cell size by:
            interpreting the given amount of memory as a desired cell size if the given amount of memory is a valid cell size; or rounding the given amount of memory up to a
nearest valid cell size to determine the desired
cell size if the given amount of memory is not
a valid cell size; and
if a bitmap of one of the plurality of cell blocks
indicates that a cell which has the desired cell size
is available:
dynamically allocate, via the memory suballocation application, the cell which has the desired
cell size to the requesting application; and
update, by the memory suballocation application,
the bitmap of the cell block to which the cell
belongs to indicate that the cell is no longer
available; and
if the desired cell size does not exceed the maximum
cell size and no cell of the desired cell size is
available, obtain, from the underlying memory allocation system, an additional cell block from the heap
having equally-sized cells of the desired cell size for
allocation to the requesting application.

9. The computing device of claim 8, wherein if the desired cell size does not exceed the maximum cell size and no cell of the desired cell size is available, the processing circuit is further configured to:
receive the allocation of the additional cell block from the underlying memory allocation system;
dynamically allocate, via the memory suballocation application and from the additional cell block, a cell to the requesting application; and
update the bitmap of the additional cell block to which the cell belongs to indicate that the cell is no longer available.

10. The computing device of claim 8, wherein the processing circuit is further configured to:
determine if a cell having the desired cell size is available by parsing the bitmaps of one or more cell blocks whose cells are of the desired cell size to determine if any cells in the one or more cell blocks are available.

11. The computing device of claim 9, wherein the processing circuit is further configured to:
receive a request to deallocate a specified cell, wherein the request includes a memory address of the specified cell;
based on the memory address of the specified cell, identify a cell block to which the specified cell belongs; and
update the bitmap of the identified cell block to indicate that the specified cell is available.

12. The computing device of claim 11:
wherein each cell block has a size of 64 kilobytes;
wherein the four least significant hexadecimal digits of each memory block base address is 0000; and
wherein to identify a cell block to which the specified cell belongs, the one or more processing circuits are configured to perform an AND operation between the memory address of the specified cell and the hexadecimal value FFFF0000 to determine a base address of the identified cell block.

13. The computing device of claim 8, wherein each valid cell size is a power of two.

14. The computing device of claim 8, wherein within a given cell block:
the plurality of equally-sized cells are located in a beginning portion of the cell block;
the bitmap of the cell block is located in a later portion of the cell block having a higher memory address than the beginning portion; and
an overrun gap separates the beginning portion of the cell block and the later portion of the cell block.

15. A computer program product comprising:
a computer readable storage medium having computer readable program code embodied therewith, wherein the computer readable program code, when executed by a processing circuit of a computing device, causes the computing device to:
obtain, by a memory suballocation application from an underlying memory allocation system, an allocation of a plurality of cell blocks from a heap portion of memory, wherein each of the cell blocks includes a plurality of equally-sized cells and a bitmap that indicates which of its plurality of cells are available, and wherein the plurality of cell blocks allocated to the memory suballocation application are managed by the memory suballocation application, and the heap portion of memory is managed by the underlying memory allocation system;
receive, from a requesting application, a request for dynamic allocation of a given amount of memory;
determine if the given amount of memory exceeds a maximum cell size of the cells in a plurality of cell blocks allocated to the memory suballocation application;
initiate a memory allocation via the underlying memory allocation system from the heap portion of memory for the given amount of memory that does not use any of the plurality of cell blocks if the given amount of memory exceeds the maximum cell size; and
if the given amount of memory does not exceed the maximum cell size:
determine a desired cell size by:
interpreting the given amount of memory as a desired cell size if the given amount of memory is a valid cell size; or
rounding the given amount of memory up to a nearest valid cell size to determine the desired cell size if the given amount of memory is not a valid cell size; and
if a bitmap of one of the plurality of cell blocks indicates that a cell which has the desired cell size is available:
dynamically allocate, via the memory suballocation application, the cell which has the desired cell size to the requesting application; and
update, by the memory suballocation application, the bitmap of the cell block to which the cell belongs to indicate that the cell is no longer available; and
if the desired cell size does not exceed the maximum cell size and no cell of the desired cell size is available, obtain, from the underlying memory allocation system, an additional cell block from the heap having equally-sized cells of the desired cell size for allocation to the requesting application.

16. The computer program product of claim 15, wherein if the desired cell size does not exceed the maximum cell size and no cell of the desired cell size is available, the computer readable program code further causes the computing device to:
receive the allocation of the additional cell block from the underlying memory allocation system;
dynamically allocate, via the memory suballocation application and from the additional cell block, a cell to the requesting application; and update the bitmap of the additional cell block to which the cell belongs to indicate that the cell is no longer available.

17. The computer program product of claim 15, wherein the computer readable program code further causes the computing device to:
determine if a cell having the desired cell size is available by parsing the bitmaps of cell blocks whose cells are of the desired cell size to determine if any cells in those cell blocks are available.

18. The computer program product of claim 15, wherein the computer readable program code further causes the computing device to:
receive a request to deallocate a specified cell, wherein the request includes a memory address of the specified cell;
based on the memory address of the specified cell, identify a cell block to which the specified cell belongs; and
update the bitmap of the identified cell block to indicate that the specified cell is available.

19. The computer program product of claim 18:
wherein each cell block has a size of 64 kilobytes;
wherein the four least significant hexadecimal digits of each memory block base address is 0000; and
wherein the computer readable program code configured to identify a cell block to which the specified cell belongs comprises computer readable program code configured to perform an AND operation between the memory address of the specified cell and the hexadecimal value FFFF0000 to determine a base address of the identified cell block.

20. The computer program product of claim 15, wherein each valid cell size is a power of two.

* * * * *